United States Patent [19]

Bindels

[11] Patent Number: 5,029,201
[45] Date of Patent: Jul. 2, 1991

[54] AUTO-ANSWER VIDEOTEX TERMINAL

[75] Inventor: Guy Bindels, Illkirch, France

[73] Assignee: Alcatel Business Systems, Paris, France

[21] Appl. No.: 511,140

[22] Filed: Apr. 19, 1990

[30] Foreign Application Priority Data

Apr. 21, 1989 [FR] France .................. 8905353

[51] Int. Cl.$^5$ .......................... H04M 11/00
[52] U.S. Cl. ........................ 379/98; 379/96; 379/100
[58] Field of Search .............. 379/96, 98, 100

[56] References Cited

U.S. PATENT DOCUMENTS 4,581,484  4/1986  Bendig ..................... 379/67
4,890,317 12/1989  Hird et al. ................ 379/132

Primary Examiner—Jin F. Ng
Assistant Examiner—Ahmad F. Matar
Attorney, Agent, or Firm—Sughrue, Mion, Zinn, Macpeak & Seas

[57] ABSTRACT

An auto-answer videotex terminal includes data signal transmission and processing circuits and an isolating transformer between them and a telephone network. It also includes circuits for detecting and recognizing the ringing signal from the network which are connected to the network by the isolating transformer for the data signal circuits. A capacitor and an attenuator resistor appropriate to the frequency and the level of the ringing signal transmitted by the network are associated with the data signal circuits. Further, selectively operated circuits bypass the attenuator resistor and reduce the impedance of the capacitor when the ringing signal is recognized.

6 Claims, 1 Drawing Sheet

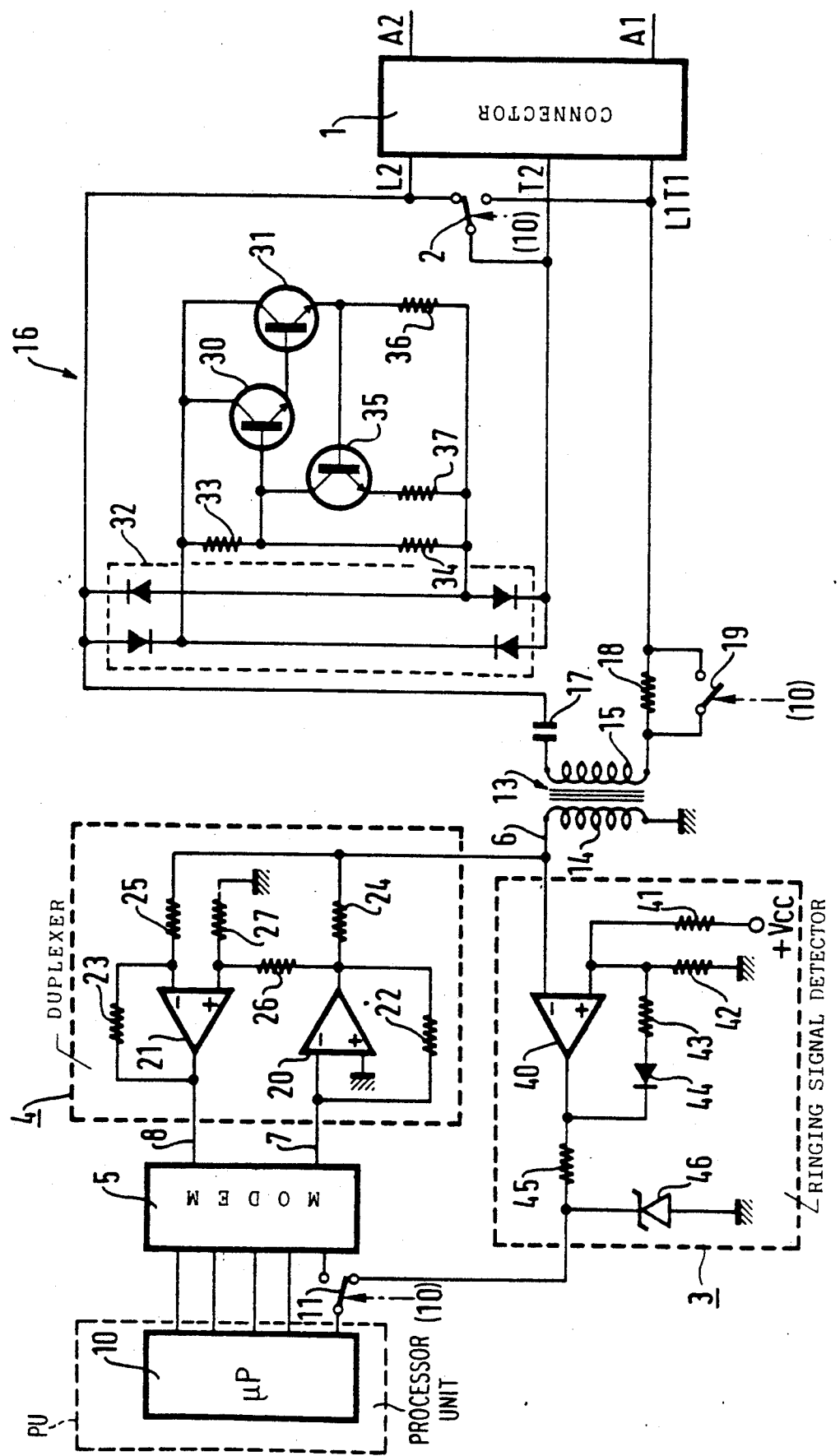

AUTO-ANSWER VIDEOTEX TERMINAL

BACKGROUND OF THE INVENTION

1. Field of the invention

The present invention concerns videotex terminals such as the "Minitel" terminal used in France. It is more particularly concerned with a terminal of this kind connected to a public switched telephone network and equipped with an auto-answer device.

2. Description of the prior art

The connection between a videotex terminal and a data server via a public switched telephone network is usually set up using a subscriber telephone. The telephone is connected via the terminal to a telephone network jack. Initially the telephone is connected to the telephone subscriber line while the terminal itself is not connected to the network. A switch in the terminal performs this function. The same switch is operated to connect the terminal to the telephone line once the connection has been set up.

The public switched telephone network is accessed to set up the connection to the server by means of the telephone with the handset off-hook. The subscriber dials the number of the data center for the server or the server's own number. The call is switched through the telephone network and is sensed at a connection center which makes the connection to the server. A return tone is sent by the server to the subscriber by way of a response. The subscriber hears this tone and recognizes that it confirms that the connection to the server has been set up. The subscriber then switches the telephone line to his terminal by pressing the key provided for this purpose to operate the aforementioned switch and then hangs up the handset of his telephone.

To enable it to be detected at the receiving end the ringing signal sent over the telephone line has defined characteristics. It represents the application of a low-frequency alternating current voltage between the line wires, usually at a frequency of 50 Hz and at a level between 25 V and 96 V.

The response tone is also predefined. Its frequency is 2100 Hz.

When the terminal and the server are connected via the network data can be exchanged between the terminal and the server using the link so set up.

To enable the exchange of data between the terminal and the server the terminal incorporates a modem connected via a duplexer to a common data transmit/-receive channel and a microprocessor-based processor unit connected to the modem. It further comprises an isolating transformer coupling the common transmit/-receive channel to the two wires of the telephone line. A current generator connected between the terminals of the transformer winding connected to the line wires maintains a direct current on the telephone line immediately the telephone connection is set up and throughout the duration of the connection, to enable the central office to sense that the telephone line is busy.

The processor unit is connected to the data entry keyboard and to the display screen of the terminal and optionally to a printer. The modem converts digital data representing data entered at the keyboard and data displayed on the screen into analog data signals transmitted in one direction or the other on the telephone line. The duplexer transmits these signals and splits the common transmit/receive channel connected to the line into two separate transmit and receive channels connected to the modem. Bidirectional transmission of the signals on the telephone line is achieved by assigning two frequency bands for the two signal transmission directions. The frequency bands are centered on 420 Hz for the signals transmitted from the terminal to the server and 1700 Hz for those transmitted from the server to the terminal. Transmission from the terminal to the server is at a relatively lower rate of 75 bauds and transmission from the server to the terminal is at a relatively higher rate of 1200 bauds, at a low peak level in either direction of 1 V maximum.

The transformer isolating the terminal from the telephone network is matched to the characteristics of the telephone line transmitting the data signals so as to have in conjunction with the current generator (or with the transmit channel of the duplexer) an impedance matched to the defined impedance of the telephone line, which is usually 600 ohms.

Adapting a "conventional" videotex terminal of the kind described to provide an auto-answer videotex terminal entails associating with the circuits assigned to the data signals and isolated from the network by the isolating transformer circuits assigned to the ringing signals to be detected, separately isolated from the network.

Compared with a conventional videotex terminal, the cost of an auto-answer videotex terminal of this kind is increased by the cost of implementing the ringing signal detection function including the isolation specific to this function.

An object of the present invention is to provide an auto-answer videotex terminal with ringing signal detection incorporated into the terminal at reduced cost.

SUMMARY OF THE INVENTION

The present invention consists in an auto-answer videotex terminal adapted to be connected to a public switched telephone network by a first pair of wires adapted to carry ringing signals and by a second pair of wires adapted to carry data signals, said terminal comprising a switching unit adapted to connect said first pair of wires to said telephone network initially and to connect said second pair of wires to said telephone network after a telephone connection is set up, data transmission means, a modem, a processor unit connected to said data transmission means by said modem, isolating means for data signals between said data transmission means and said telephone network, ringing signal detection means, an operational amplifier in said ringing signal detection means, detected ringing signal recognition means connected to an output of said operational amplifier, a capacitor compatible with the ringing signal frequency and a resistor for attenuating said ringing signal associated with said isolating means for a call answering operating mode of said terminal, an input of said operational amplifier connected to said first pair of wires by said isolating means, said capacitor and said attenuator resistor, and means for bypassing said attenuator resistor and means for reducing the impedance of said capacitor, adapted to be commanded with said switching unit when said ringing signal is recognized for the data transfer operating mode of said terminal.

In accordance with another characteristic of the invention the detector operational amplifier reference input has a high threshold and a low threshold for changing its output state to produce the detected signal in the form of pulses at a frequency equal to that of said ringing signal and having a specified duration of at least a few milliseconds.

In accordance with a further characteristic of the invention said impedance reducing means comprise a current generator adapted to absorb current from the telephone line when the connection has been set up and which has a limited finite impedance of substantially 1800 ohms.

The characteristics and advantages of the present invention will emerge more clearly from the following description of one embodiment shown in the appended drawing.

BRIEF DESCRIPTION OF THE DRAWING

The single FIGURE shows the circuitry of an autoanswer videotex terminal in accordance with the invention.

DETAILED DESCRIPTION OF THE INVENTION

The auto-answer videotex terminal in accordance with the present invention is connected to two wires A1, A2 of the public switched telephone network by a connector 1 connected to the auto-answer videotex terminal by three wires L1T1, T2 and L2. Two of these wires, T1 and T2, correspond to the pair of wires connected to a subscriber telephone (not shown) to send dialling signals over the line. The other two wires L1 and L2 correspond to the wires connected to the circuitry of a conventional videotex terminal for bidirectional transfer of data signals on the telephone line A1, A2 when the requested connection has been set up.

In the videotex terminal a switch 2 connected to the wire T2 connects the wire T2 to the wire L2 or the wire T2 to the wire L1T1. It corresponds to the switch of a conventional videotex terminal which when idle connects the telephone to the network via the wire L2 connected to the wire T2 and which is operated manually when the relevant key on the conventional terminal is pressed, once the connection has been set up. The switch 2 is shown in its idle position in which it enables a dialling signal to be sent by the subscriber telephone and in which it enables the auto-answer videotex terminal in accordance with the present invention to detect a ringing signal. In its other, active position it connects the wire T2 to the wire L1T1 for transferring data.

The auto-answer videotex terminal includes a ringing signal detector 3. It also includes a duplexer 4 and a modem 5 for data signals. The duplexer 4 handles the transfer of data signals in both directions between a common transmit/receive channel 6 and two separate transmit and receive channels 7 and 8. The individual channels 7 and 8 are connected to the modem 5. A processor unit pu (not shown in full) based on a microprocessor 10 is connected to the modem to process data signals transmitted or received and is also connected through a switch 11 to the ringing signal detector 3, to enable it to recognize ringing signals. The microprocessor 10 is also connected to a keyboard, a screen and a printer (not shown) for entry at the keyboard of data to be transmitted and for display on the screen of data received and to be transmitted by the videotex terminal, together with their printout, if required.

In the auto-answer videotex terminal an isolating transformer 13 for bi-directional transmission of data signals on the telephone line through the switch 2 in the active position connects the common transmit/receive channel 6 for the duplexer 4 to the wires L1, L2. The transformer has a first winding 14 which is grounded and defines at its opposite terminal the common transmit/receive channel 6. Its second winding 15 is connected to the wires L1, L2.

A current generator 16 between the terminals of the winding 15 of the transformer 13 and shunting the wires L1, L2 enables the central office to sense the busy state of the telephone line.

The transformer 13 also couples the ringing signal detector 3 and the telephone line A1, A2 or the wires T1, T2 when the switch 2 is in its idle position. To allow for the characteristics of the ringing signal, which is usually at a frequency of 50 Hz and has a level of at least 25 V, the winding 15 of this transformer is connected between the wires T1, T2 when the switch 2 is in the idle position via a capacitor 17 and a resistor 18.

The value of the capacitor 17 is substantially 1 $\mu$F, being chosen to suit the frequency of the ringing signal received from the telephone line and to be detected by the detector 3 of the auto-answer videotex terminal. The value of the resistor 18 is chosen to attenuate as necessary the ringing signal transmitted by the transformer. Its value is around 33 kohms.

In this auto-answer videotex terminal the isolating transformer 13 is used for the data signals and also for the ringing signals. A switch 19 is connected across the resistor 18. The switch 19 is closed when the switch 2 is in the active position to shunt the resistor 18 and so bypass the attenuation that it otherwise provides when the terminal is transferring data.

The switches 2, 11 and 19 of the terminal are controlled automatically by the microprocessor 10 as symbolically represented by the arrows marked (10). The idle position of the switch 2 corresponds to an idle position of the switch 11 in which the threshold detector 3 is connected to the microprocessor 10 which can recognize the ringing signal to the terminal and to an idle position of the switch 19 in which this switch is open and does not shunt the resistor 18. The switch 11 could be dispensed with, the microprocessor 10 then being connected to the modem 5 and to the detector 3 by two independent connections.

In a similar way to the circuit associated with the resistor 18, the auto-answer videotex terminal is equipped with means for reducing the impedance of the capacitor 17 when the terminal is transferring data. These means may comprise an additional capacitor with an associated switch (not shown) shunting the capacitor 17. It is preferably in the form shown by the current generator 16, however, which has a selected, finite impedance to match the impedance of the transformer to that specified for the telephone line, which has a value between 400 and 900 ohms.

The circuits of the auto-answer videotex terminal are described hereinafter.

In this terminal the modem 5 and the microprocessor 10 are known circuits, the microprocessor 10 being further adapted to recognize the frequency of the detected ringing signal which it receives from the detector 3 through the closed switch 11.

The duplexer 4 is also a circuit known as such. It comprises a transmit operational amplifier 20 and a receive operational amplifier 21 for data signals between channels 7 and 8 and the channel 6, in other words between the modem 5 and the transformer 13.

Each amplifier has a respective feedback resistor 22 or 23 between its negative input and its output. The output of the transmit amplifier 20 is connected to the common transmit/receive channel 6 through a resistor 24. The negative input of the receive amplifier 21 is connected to the same channel 6 through a resistor 25. The output of the transmit amplifier is connected to the positive input of the receive amplifier through a resistor 26, and this positive input is also grounded through a resistor 27 to enable generation of the receive data signal from the transmit/receive signal present on the channel 6 and the transmit signal from the amplifier 20.

The current generator 16 includes a Darlington circuit with two transistors 30 and 31 controlled via a diode rectifier bridge 32 and a resistor bridge comprising resistors 33 and 34. The output transistor 31 of the Darlington circuit has is collector connected to that of the transistor 30 and to one terminal of the diode bridge, to which the resistor 33 is connected. Its emitter is connected through a resistor 36 to the opposite terminal of the diode bridge, to which the other resistor 34 is connected and which controls the resistor 35. The other two terminals of the diode rectifier bridge are connected to the wires L2 and L1 (through the switch 2 when it is in the active position in the case of the wire L1).

The collector of the transistor 35 and the base of the transistor 30 are connected through the resistor 33 to one terminal of the diode bridge. The emitter of the transistor 35 is connected through a resistor 37 to the other bridge terminal.

In this current generator the resistors R33 and R34 are of the same value which is very much higher than that of the resistor 37 or the resistor 36. The current generator 16 is given a finite impedance Z in the order of 1800 ohms by appropriately choosing the values of these resistors, for example: R33=10 kohms, R37=143 ohms and R36=25.5 ohms.

When the connection has been set up, the current generator 16 absorbs current on the telephone line in the conventional way so that the central office can recognize the busy state of the connection. It also reduces the impedance due to the capacitor 17 when transferring data.

The ringing signal detector 3 includes an operational amplifier 40. Its negative input is connected to the transmit/receive channel 6 at the non-grounded terminal of the winding 14 of the transformer 13. Its positive input is connected to a resistor bridge comprising a resistor 41 connected to the 5 V supply rail +Vcc and a resistor 42 connected to ground. This input is also connected to its output through a resistor 43 and a diode 44. The output of the amplifier 40 is connected through a resistor 45 and the switch 11 when the latter is in the idle position to the microprocessor 10. A Zener diode 46 connected between the output side of the resistor 45 and ground limits the level of the output signal from the detector 3 to a TTL-compatible value.

In the ringing signal detector 3 the feedback circuit comprising the diode 44 and the resistor 43 is turned off by a high level at the output of the operational amplifier 40 and turned on by a low level at this output. This produces at its positive input a high threshold value which causes the output signal of this amplifier to switch from the high level to the low level and a low threshold value causing the opposite switching of the output level of the amplifier 40. The high threshold value is defined by the resistors 41 and 42 and is selected to correspond to the substantially linear and rising part of the positive half-wave of the ringing signal on the channel 6. The low threshold value is defined by the resistors 41, 42 and 43 and is near 0 V.

These high and low threshold values make it possible to obtain at the output of the operational amplifier 40 a signal whose pulses at the frequency of the ringing signal have a duration greater than 4 ms so that they can be processed by the microprocessor 10 to recognize the ringing frequency.

The resistors 41, 42 and 43 advantageously have the following values: R41=100 kohms, R42=5.1 kohms and R43=150 kohms.

For a voltage +Vcc=+5 V the high threshold level is then Vs+ =240 mV.

With the auto-answer videotex terminal initially set to receive the ringing signal with the switches 2, 19 and 11 in the idle position, the current generator 16 is bypassed and the wires L2 and T2 are connected by the switch 2. Ringing signals on the wires T1 and T2 are strongly attenuated by the resistor 18 and transmitted through the capacitor 17 and the transformer 13 to the channel 6. With the transmit amplifier 20 of the duplexer 4 in the idle condition the resistor 24 is grounded and is therefore in parallel with the winding 14 of the transformer 13 and constitutes the load resistor on the winding 14 for these ringing signals. The value of the resistor 24 is substantially 1 kohm. The impedance of the circuit as a whole is determined by its value and the overall impedance of the transformer 13, the capacitor 17 and the resistor 18.

The signal on the channel 6 is detected by the operational amplifier 40. The output signal from the operational amplifier 40 is reduced to a TTL-compatible level by the Zener diode 46 and transmitted to the microprocessor 10. The frequency of the pulses of the detected signal, which depends on the frequency of the ringing signal on the line, can then be recognized directly by the microprocessor 10.

Recognition of the ringing signal by the microprocessor of the terminal changes the switches 2, 19 and 11 to their active state. The ringing signal detector 3 is preferably isolated from the microprocessor 10 by the switch 11. The microprocessor 10 then causes the 2100 Hz response tone to be sent via the modem over the line to the calling terminal where it is detected to enable the subscriber to connect his videotex terminal to the telephone network.

The called auto-answer videotex terminal and the calling videotex terminal are then connected and data is exchanged between them with the auto-answer videotex terminal functioning as a server, in other words transmitting in the high frequency band centered on 1700 Hz and receiving data signals from the calling terminal in the low frequency band centered on 420 Hz.

The data signal transmitted by the videotex terminal may begin with a "greeting" page for the calling terminal. A greeting page of this kind is initially memorized in memories associated with the microprocessor 10 in the processor unit. It invites the calling terminal to continue the procedure for exchanging data with the called auto-answer terminal.

There is claimed:

1. An auto-answer videotex terminal adapted to be connected to a public switched telephone network by a first pair of wires for carrying ringing signals and by a second pair of wires for carrying data signals, said terminal operable in a call answering mode and a data transmitting mode and comprising a switching unit for connecting said first pair of wires to said telephone network initially and for connecting said second pair of wires to said telephone network after a telephone connection is set up, data transmission means, a modem, a processor unit connected to said data transmission means by said modem, isolating means for data signals between said data transmission means and said telephone network, a capacitor compatible with the ringing signal frequency and a resistor for attenuating said ringing signal associated with said isolating means in said call answering operating mode of said terminal, ringing signal detection means, including an operational amplifier having a first input and an output, said first input being connected to said first pair of wires by said isolating means, said capacitor and said attenuator resistor, detected ringing signal recognition means connected to said output of said operational amplifier, first means for bypassing said attenuator resistor and second means for reducing the impedance of said capacitor, said first and second means being controlled by said processor unit together with said switching unit when said ringing signal is recognized for said data transfer operating mode of said terminal.

2. An auto-answer videotex terminal according to claim 1, wherein said detected ringing signal recognition means comprise a microprocessor connected to the output of said operational amplifier and a circuit for limiting the level of the detected ringing signal.

3. An auto-answer videotex terminal according to claim 2, wherein a reference input of said operational amplifier has a high threshold and a low threshold for changing its output state to produce the detected signal in the form of pulses at a frequency equal to that of said ringing signal and having a specified duration of at least a few milliseconds.

4. An auto-answer videotex terminal according to claim 3, comprising a resistor bridge connected to said reference input of said operational amplifier and between a voltage supply and ground, and a resistor and diode circuit connecting said reference input to the output of said operational amplifier defining said low and high thresholds.

5. An auto-answer videotex terminal according to claim 1, comprising a current generator for absorbing a current on the telephone line after the telephone connection has been set up and for the duration of said data transfer operating mode of the terminal, and wherein said means for reducing the impedance of said capacitor comprise said current generator which has a limited finite impedance.

6. An auto-answer video terminal according to claim 5, wherein the impedance of said current generator is substantially 1800 ohms.

* * * * *